United States Patent
Hwang

(10) Patent No.: US 9,865,901 B2
(45) Date of Patent: Jan. 9, 2018

(54) BATTERY SYSTEM AND METHOD FOR CONNECTING A BATTERY TO THE BATTERY SYSTEM

(71) Applicant: Samsung SDI Co., Ltd., Yongin-si, Gyeonggi-do (KR)

(72) Inventor: Eui-Jeong Hwang, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 308 days.

(21) Appl. No.: 14/539,867

(22) Filed: Nov. 12, 2014

(65) Prior Publication Data

US 2015/0155602 A1 Jun. 4, 2015

(30) Foreign Application Priority Data

Dec. 3, 2013 (KR) .......................... 10-2013-0148994

(51) Int. Cl.
*H01M 10/44* (2006.01)
*H01M 10/42* (2006.01)
(Continued)

(52) U.S. Cl.
CPC ..... *H01M 10/425* (2013.01); *H01M 10/4207* (2013.01); *H02J 7/0014* (2013.01);
(Continued)

(58) Field of Classification Search
CPC ..................... H01M 10/425; H01M 2010/4271
(Continued)

(56) References Cited

U.S. PATENT DOCUMENTS 9,071,056 B2 6/2015 Yang et al.
2003/0129457 A1\* 7/2003 Kawai ................ G01R 31/3658
429/7
(Continued)

FOREIGN PATENT DOCUMENTS

EP 1 328 052 A2 7/2003
EP 2 372 867 A1 10/2011
(Continued)

OTHER PUBLICATIONS

Korean Office Action dated Nov. 18, 2015 for Korean Patent Application No. KR 10-2013-0148994 which corresponds to captioned U.S. Appl. No. 14/539,867.
(Continued)

*Primary Examiner* — Gary Harris
(74) *Attorney, Agent, or Firm* — Knobbe, Martens, Olson & Bear, LLP

(57) ABSTRACT

A battery system and method for connecting a battery to the battery system are disclosed. In one aspect, the battery system includes at least one first battery, a second battery, a first switch configured to connect the second battery in parallel to the first battery and a second switch and a resistor connected in series and configured to connect the second battery in parallel to the first battery. The first switch and the second switch are connected in parallel. The battery system further includes a battery management system (BMS) configured to turn on the second switch so as to connect the second battery to the first battery. The BMS is further configured to turn off the second switch and turn on the first switch when the difference in voltage between the second battery and the first battery reaches a predetermined value.

11 Claims, 8 Drawing Sheets

(51) Int. Cl.
*H02J 7/00* (2006.01)
*H02J 3/38* (2006.01)
*H02J 7/35* (2006.01)

(52) U.S. Cl.
CPC ...... *H01M 2010/4271* (2013.01); *H02J 3/381* (2013.01); *H02J 7/007* (2013.01); *H02J 7/35* (2013.01); *Y02P 90/50* (2015.11)

(58) Field of Classification Search
USPC ...................................................... 429/50, 61
See application file for complete search history.

(56) References Cited

U.S. PATENT DOCUMENTS

| | | | |
|---|---|---|---|
| 2010/0253286 | A1 | 10/2010 | Sutardja |
| 2011/0003182 | A1* | 1/2011 | Zhu .................... H01M 10/617 429/50 |
| 2013/0093248 | A1* | 4/2013 | Liu ...................... H02J 7/0016 307/77 |
| 2014/0028263 | A1 | 1/2014 | Jo et al. |

FOREIGN PATENT DOCUMENTS

| | | |
|---|---|---|
| JP | 2002-017050 A | 1/2002 |
| JP | 2012-185991 A | 9/2012 |
| KR | 10-2010-0062702 A | 6/2010 |
| KR | 10-1035705 B1 | 5/2011 |
| KR | 10-2012-0036490 A | 4/2012 |
| KR | 10-2013-0049706 A | 5/2013 |
| WO | WO 2012/143985 A1 | 10/2012 |
| WO | WO 2013/056093 A1 | 4/2013 |
| WO | WO 2013/065364 A1 | 5/2013 |

OTHER PUBLICATIONS

Extended European Search Report dated Jun. 9, 2015 for European Patent Application No. 14 194 260.7 which shares priority of Korean Patent Application No. KR 10-2013-0148994 with captioned U.S. Appl. No. 14/539,867.

European Examination Report—EP Communication pursuant to Article 94(3) EPC—dated Mar. 17, 2017 for European Patent Application No. EP 14 194 260.7, which shares priority of Korean Patent Application No. KR 10-2013-0148994 with subject U.S. Appl. No. 14/539,867.

European Examination Report dated Nov. 22, 2017 for European Patent Application No. EP 14 194 260.7 which cites the above-identified reference, and which shares priority of Korean Patent Application No. KR 10-2013-0148994 with subject U.S. Appl. No. 14/539,867.

\* cited by examiner

BATTERY SYSTEM AND METHOD FOR CONNECTING A BATTERY TO THE BATTERY SYSTEM

CROSS-REFERENCE TO RELATED APPLICATION

This application claims the benefit of Korean Patent Application No. 10-2013-0148994 filed on Dec. 3, 2013, the contents of which are incorporated herein by reference in their entirety.

BACKGROUND

Field

The described technology generally relates to a battery system and a method for connecting a battery.

Description of the Related Technology

In order to combat the problem of environmental damage, resource depletion, etc. systems capable of storing energy and efficiently using and supplying the stored energy are currently being researched. In addition to such systems, the importance of renewable energy is increasing. The generation of renewable energy creates less or no pollution when compared to traditional power generation methods. An energy storage system is a system which connects renewable energy, a battery system for storing power, and existing power grids. A large amount of research has been conducted in this area in view of recent environmental changes.

SUMMARY OF CERTAIN INVENTIVE ASPECTS

One inventive aspect is a battery system including a control means which enables a battery to be stably connected to the battery system and a method for connecting a battery.

Another aspect is a battery system, including: a first switch provided on a path between a module configured by connecting a plurality of first batteries in parallel and a second battery; a second switch connected in parallel to the first switch; a resistive element connected in series to the second switch; and a battery management system (BMS) configured to turn on the second switch so as to connect the second battery and the module, and turn on the first switch when the difference in voltage between the second battery and the module reaches a predetermined value.

The BMS may measure the voltage of the second battery, and receive the voltage of the module from the BMS of the first battery adjacent to the second battery.

The BMS may control the on/off of the second switch by controlling the duty ratio of the second switch.

The BMS may control the on/off of the second switch with a duty ratio predetermined when the second switch is initially operated, and gradually increase the duty ratio.

When the current flowing through the resistive element reaches a predetermined critical current value, the BMS may increase the duty ratio, and reset the duty ratio by decreasing the critical current value.

The battery system may further include a temperature measuring unit configured to measure a temperature of the resistive element.

The BMS may control the duty ratio of the second switch so that the temperature of the resistive element, measured by the temperature measuring unit, maintains a predetermined dangerous temperature or less.

The BMS may set the duty ratio of the second switch to be lower than an initially set duty ratio when the temperature of the resistive element reaches the predetermined dangerous temperature, and set the duty ratio of the second switch to be higher than the initially set duty ratio when the temperature of the resistive element reaches a predetermined safe temperature.

The resistive element may be a variable resistor.

After the second switch is turned on, the BMS may decrease the resistance of the variable resistor as time elapses.

The BMS may decrease the resistance of the variable resistor when the current flowing through the resistive element is dropped to a critical current value or less, and reset the duty ratio by decreasing the critical current value by a predetermined value.

The BMS may turn off the second switch at the same time when the first switch is turned on.

The module may be a battery rack configured with a plurality of battery trays connected in parallel, which store energy in an energy storage system. The second battery may be a battery tray connected in parallel to the battery rack.

The BMS may be connected to each of the plurality of battery trays, to monitor the voltage, current and temperature of the battery tray.

Another aspect is a method for connecting a battery, the method including: connecting a first switch on a path between a module configured by connecting a plurality of first batteries in parallel and a second battery; connecting a second switch and a resistive element in parallel to the first switch; controlling the second switch so as to connect the second battery and the module; and turning on the first switch when the difference in voltage between the second battery and the module reaches a predetermined value.

The controlling of the second switch may include the steps of: (a) controlling the on/off of the second switch with a predetermined duty ratio; (b) resetting the duty ratio by increasing the predetermined duty ratio when the current flowing through the resistive element reaches a predetermined critical current value; (c) resetting the duty ratio by decreasing the critical current value; and (d) repetitively performing steps (a) to (c) until the difference in voltage between the second battery and the module reaches the predetermined value.

In the controlling of the second switch, the duty ratio of the second switch may be controlled so that the temperature of the resistive element maintains a predetermined dangerous temperature or less.

The resistive element may be a variable resistor. The controlling of the second switch may include the steps of: (a) turning on the second switch; (b) decreasing the resistance of the variable resistor when the current flowing through the resistive element reaches a critical current value; (c) resetting the duty ratio by decreasing the critical current value; and (d) repetitively performing steps (b) and (c) until the difference in voltage between the second battery and the module reaches the predetermined value.

Another aspect is a battery system comprising at least one first battery; a second battery; a first switch configured to connect the second battery in parallel to the first battery; a second switch and a resistor connected in series and configured to connect the second battery in parallel to the first battery, wherein i) the first switch and ii) the second switch and the resistor are connected in parallel; and a battery management system (BMS) configured to: i) turn on the second switch so as to connect the second battery to the first battery and ii) turn off the second switch and turn on the first switch when the difference in voltage between the second battery and the first battery reaches a predetermined value, and wherein the BMS is further configured to control the duty ratio of the second switch.

The BMS can be further configured to: i) measure the voltage of the second battery and ii) receive the voltage of the first battery. The BMS can be further configured to: i) set the duty ratio of the second switch to a predetermined level when the second switch is initially turned on and ii) increase the duty ratio as the voltage difference between the first and second batteries decreases. When the current flowing through the resistor reaches a critical current value, the BMS can be further configured to i) increase the duty ratio and ii) decrease the critical current value. The battery system can further comprise a thermometer configured to measure the temperature of the resistor. The BMS can be further configured to control the duty ratio of the second switch so that the temperature of the resistor is less than a first predetermined temperature.

The BMS can be further configured to: i) lower the duty ratio of the second switch when the temperature of the resistor reaches the first predetermined temperature and ii) increase the duty ratio of the second switch when the temperature of the resistor reaches a second predetermined temperature lower than the first predetermined temperature. The resistor can be a variable resistor. The BMS can be further configured to decrease the resistance of the variable resistor as time elapses after the second switch is initially turned on. When the current flowing through the variable resistor is less than a critical current value, the BMS can be further configured to: i) decrease the resistance of the variable resistor and ii) decrease the critical current value. The BMS can be further configured to turn off the second switch and turn on the first switch at substantially the same time.

Another aspect is a method for connecting a first battery to a battery rack, the method comprising connecting the first battery to: i) a first switch and ii) a second switch and a resistor in series; controlling the second switch so as to connect the first battery to a plurality of second batteries connected in parallel; and turning on the first switch so as to connect the first battery to the second batteries when the difference in voltage between the first battery and the second batteries reaches a first predetermined value, wherein the BMS is further configured to control the duty ratio of the second switch.

The controlling of the second switch can comprise setting the duty ratio of the second switch to a predetermined level; increasing the duty ratio of the second switch when the current flowing through the resistor reaches a critical current value; decreasing the critical current value; and repeating the setting, the increasing and the decreasing until the difference in voltage between the first battery and the second batteries reaches the predetermined value. The method can further comprise controlling the duty ratio of the second switch so that the temperature of the resistor is less than a first predetermined temperature. The resistor can be a variable resistor and the controlling of the second switch can include turning on the second switch; decreasing the resistance of the variable resistor when the current flowing therethrough reaches a critical current value; decreasing the critical current value; and repeating the turning on, the decreasing of the resistance and the decreasing of the critical current value until the difference in voltage between the first battery and the second batteries reaches the predetermined value.

Another aspect is a battery rack comprising a first terminal; a second terminal; a plurality of batteries electrically connected in parallel between the first and second terminals, wherein each of the batteries is connected to one of the first and second terminals via a second switch and a resistor connected in series; and a battery management system (BMS), wherein the BMS is configured to i) determine whether the difference in voltage between the batteries and a terminal voltage between the first and second terminals is greater than a predetermined value and ii) reduce the difference in voltage between the batteries and the terminal voltage when the difference is greater than the predetermined value, wherein the BMS is further configured to control the duty ratio of one of the second switches.

The battery rack can further comprise a plurality of battery management systems (BMSs) respectively corresponding to the batteries. Each battery can be electrically connected to one of the first and second terminals via: i) a first switch and ii) the second switch and the resistor connected in series and each of the BMSs can be configured to: i) control the duty ratio of the corresponding second switch when the corresponding battery is initially connected to the first and second terminals and ii) turn on the first switch when the difference in voltage between the corresponding battery and the terminal voltage is less than the predetermined value. Each of the BMSs can be further configured to increase the duty ratio of the corresponding second switch as the voltage of the corresponding battery approaches the voltage between the first and second terminals. Each of the BMSs can be further configured to: i) measure the temperature of the corresponding resistor and ii) control the duty ratio of the corresponding second switch so that the temperature of the corresponding resistor is less than a predetermined value.

According to at least one embodiment, it is possible to stably connect a battery to the battery system.

DETAILED DESCRIPTION OF CERTAIN INVENTIVE EMBODIMENTS

Figure 1:
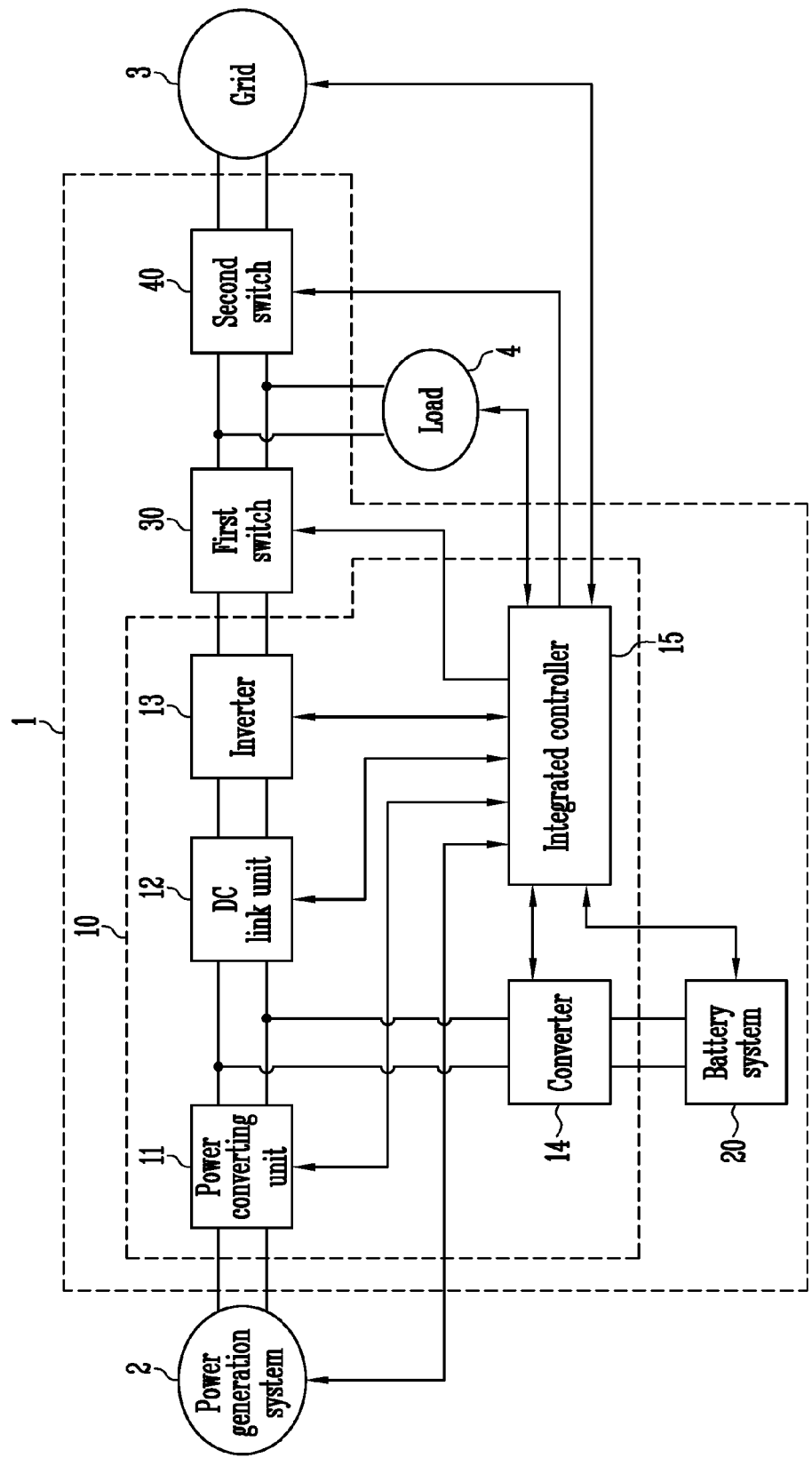
FIG. 1 is a diagram illustrating the configuration of an energy storage system according to an embodiment.

Battery systems store externally supplied power and supply the stored power to external systems. In order to provide the necessary capacity to a battery system, the battery system includes a plurality of batteries connected in parallel.

When any one of the batteries malfunctions or when increasing the capacity of the battery system, additional batteries can be connected to the system.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the figures, dimensions may be exaggerated for clarity of illustration. It will be understood that when an element is referred to as being "between" two elements, it can be the only element between the two elements, or one or more intervening elements may also be present. Like reference numerals refer to like elements throughout.

In the following detailed description, only certain exemplary embodiments have been shown and described, simply by way of illustration. As those skilled in the art would realize, the described embodiments may be modified in various different ways, all without departing from the spirit or scope of the described technology. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

FIG. 1 is a diagram illustrating the configuration of an energy storage system according to an embodiment.

The energy storage system 1 supplies, to a load 4, power received from a power generation system 2 and/or a grid 3.

The power generation system 2 generates power using an energy source. The power generation system 2 supplies the generated power to the energy storage system 1. The power generation system 2 may be, for example, a solar power generation system, a wind power generation system, a tidal power generation system, a geothermal power generation system, or the like. The power generation system 2 may be any power generation system which generates power, using any energy source such as solar heat or subterranean heat. Particularly, a solar cell which generates electrical energy, using sunlight, may be applied to the energy storage system 1. By using the energy storage system 1, the power from the power generation system 2 may be distributed to houses and factories. The power generation system 2 may include a high-capacity energy system which includes a plurality of power generation modules and generates power for each power generation module.

The grid 3 may include a power plant, a substation, power lines, and the like. If the grid 3 is in a normal state, the grid 3 supplies power to the energy storage system 1 to supply the power to the load 4 and/or a battery system 20. In addition, the grid 3 receives power from the energy storage system 1. If the grid 3 is in an abnormal state, the grid 3 does not supply power to the energy storage system 1 and the energy storage system 1 does not supply power to the grid 3.

The load 4 consumes power generated by the power generation system 2, power stored in the battery system 20, and/or power supplied from the grid 3. A house, a factory or the like may be selectively included in the load 4.

The energy storage system 1 may store power generated by the power generation system 2 in the battery system 20 and supply the generated power to the grid 3. The energy storage system 1 may supply power stored in the battery system 20 to the grid 3 or store power supplied from the grid 3 in the battery system 20. When the grid 3 is in the abnormal state, for example, when a power failure occurs in the grid 3, the energy storage system 1 may supply power to the load 4 by performing an uninterruptible power supply (UPS) operation. Even when the grid 3 is in the normal state, the energy storage system 1 may supply, to the load 4, power generated by the power generation system 2 or power stored in the battery system 20.

The energy storage system 1 of the FIG. 1 embodiment includes a power conversion system (hereinafter, referred to as a 'PCS') 10 which controls power conversion, the battery system 20, a first switch 30, a second switch 40, and the like.

The PCS 10 converts power received from the power generation system 2, the grid 3 and the battery system 20 into a suitable form for the grid 3, the load 4, and the battery system 20. The PCS 10 performs power conversion to and from an input/output terminal. Here, the power conversion may be at least one of between DC and AC and between first and second voltages. The PCS 10 supplies the converted power to an appropriate destination according to an operation mode under the control of an integrated controller 15. The PCS 10 includes a power converting unit 11, a DC link unit 12, an inverter 13, a converter 14, and the integrated controller 15.

The power converting unit 11 is a power converting device connected between the power generation system 2 and the DC link unit 12. The power converting unit 11 delivers power generated by the power generation system 2 to the DC link unit 12. An output voltage from the power converting unit 11 is a DC link voltage.

The power converting unit 11 may include a power conversion circuit, such as a converter or a rectifier circuit, according to the type of the power generation system 2. For example, when the power generation system 2 generates DC power, the power converting unit 11 may include a converter for converting the voltage level of the DC power of the power generation system 2 into that of the DC power of the DC link unit 12. However, when the power generation system 2 generates AC power, the power converting unit 11 may be a rectifier circuit for converting the AC power into DC power. Particularly, when the power generation system 2 is a solar power generation system, the power converting unit 11 may include a maximum power point tracking (MPPT) converter which performs an MPPT control so as to obtain maximum power output from the power generation system 2 according to the changing state of solar radiation, temperature or the like. When the power generation system 2 generates no power, the operation of the power converting unit 11 may be stopped to minimize power consumption.

The DC link voltage may become unstable due to an instantaneous voltage drop of the power generation system 2 or the grid 3, a sudden change or a high level in the power demand of the load 4, etc. However, the DC link voltage is necessarily stabilized to normally operate the inverter 13 and the converter 14. The DC link unit 12 is connected between the power converting unit 11 and the inverter 13 to maintain the DC link voltage. The DC link unit 12 may include, for example, a mass storage capacitor, etc.

The inverter 13 is a power converting device connected between the DC link unit 12 and the first switch 30. The inverter 13 may include an inverter which converts the DC output voltage from the DC link unit 12 into an AC voltage for the grid 3 in a discharging mode. The inverter 13 may include a rectifier circuit which rectifies the AC voltage output from the grid 3 and converts the rectified AC voltage into a DC link voltage so that power from the grid 3 may be stored in the battery system 20 in a charging mode. That is, the inverter 13 may be a bidirectional inverter in which the directions of input and output are changeable.

The inverter 13 may include a filter for removing harmonics from the AC voltage output to the grid 3. Also, the inverter 13 may include a phase-locked loop (PLL) circuit for matching the phase of the AC voltage output from the inverter 13 to the phase of the AC voltage of the grid 3 in order to prevent reactive power loss. In addition, the inverter 13 may perform other functions such as restriction of voltage variation range, power factor correction, removal of DC components, and protection against transient phenomena. When the inverter 13 is not used, the operation of the inverter 13 may be stopped so as to minimize power consumption.

The converter 14 is a power converting device which is connected between the DC link unit 12 and the battery system 20. The converter 14 includes a DC-DC converter which converts the voltage of the power output from the battery system 20 into a DC link voltage for the inverter 13 in a discharge mode. Also, the converter 14 may include a DC-DC converter which converts the voltage of the power output from the power converting unit 11 or the inverter 13 into a voltage for the battery system 20 in a charging mode. That is, the converter 14 may be a bidirectional converter in which directions of input and output are changeable. When the converter 14 is not used to charge or discharge the battery system 20, the operation of the converter 14 may be stopped so as to minimize power consumption.

The integrated controller 15 monitors the states of the power generation system 2, the grid 3, the battery system 20 and the load 4, and controls the operations of the power converting unit 11, the inverter 13, the converter 14, the battery system 20, the first switch 30, and the second switch 40 according to the monitoring results. The integrated controller 15 may monitor whether a power failure occurs in the grid 3, whether the power generation system 2 generates power, an amount of power generated by the power generation system 2, a charge state of the battery system 20, an amount of power consumed by the load 4, time, and the like. When power to be supplied to the load 4 is insufficient, for example, due to the occurrence of a power failure in the grid 3, the integrated controller 15 may control the load 4 to determine priorities for devices which use power included in the load 4 and to supply power to the devices which use power having high priorities.

The first and second switches 30 and 40 are connected in series between the inverter 13 and the grid 3 and control the flow of current between the power generation system 2 and the grid 3 by being turned on or off under the control of the integrated controller 15. The first and second switches 30 and 40 may be turned on or off according to the states of the power generation system 2, the grid 3 and the battery system 20.

Specifically, in order to supply power from the power generation system 2 and/or the battery system 20 to the load 4 or to supply power from the grid 3 to the battery system 20, the first switch 30 is turned on. In order to supply power from the power generation system 2 and/or the battery system 20 to the grid 3 or to supply power from the grid 3 to the load 4 and/or the battery system 20, the second switch 40 is turned on. Switching devices such as relays capable of transmitting a large current may be used as the first and second switches 30 and 40.

When a power failure occurs in the grid 3, the second switch 40 is turned off and the first switch 30 is turned on. That is, power from the power generation system 2 and/or the battery system 20 is supplied to the load 4, and simultaneously, the power supplied to the load 4 is prevented from flowing into the grid 3. The isolation of the energy storage system 1 from the grid 3, in which the power failure occurs, prevents the energy storage system 1 from supplying power to the grid 3. Accordingly, a worker who works at a power distribution line of the grid 3 to, for example, fix the failure in the grid 3, will not receive an electric shock from the power of the energy storage system 1.

The battery system 20 receives and stores power generated by the power generation system 2 and/or power output from the grid 3 and supplies the stored power to the load 4 or the grid 3. The battery system 20 may include a portion for storing power and a portion for controlling and protecting the portion for storing power. Hereinafter, the battery system 20 will be described in detail with reference to FIG. 2.

Figure 2:
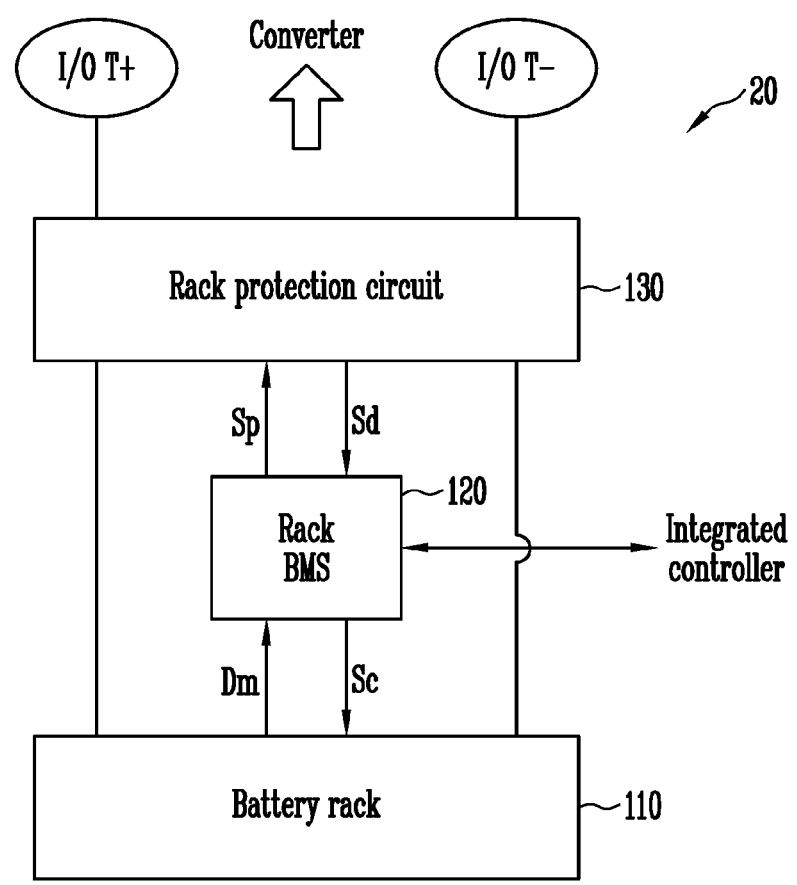
FIG. 2 is a diagram illustrating the configuration of a battery system according to an embodiment.

FIG. 2 is a diagram illustrating the configuration of a battery system according to an embodiment.

Referring to FIG. 2, the battery system 20 may include a battery rack 110, a rack battery management system (BMS) 120 and a rack protection circuit 130.

The battery rack 110 stores power supplied from the power generation system 2 and/or the grid 3 and supplies the stored power to the power generation system 2 and/or the grid 3. The battery rack 110 may include a plurality of subunits, which will be described in detail with reference to FIG. 3.

Figure 3:
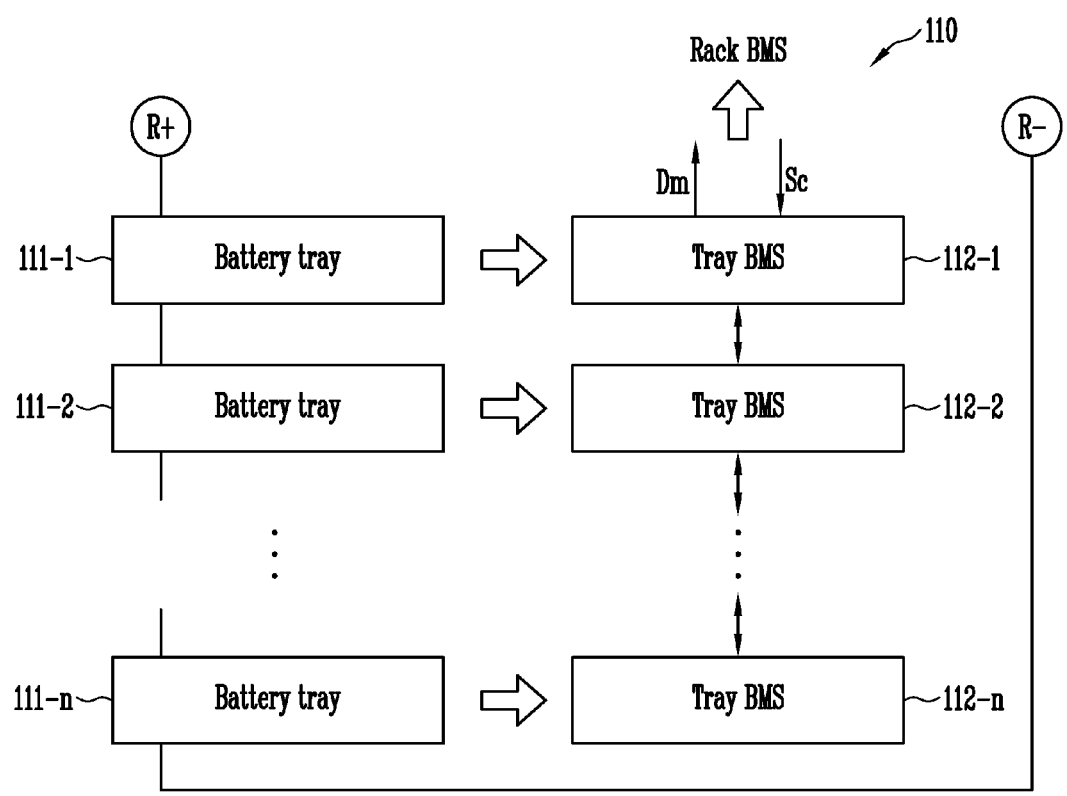
FIG. 3 is a diagram illustrating the configuration of a battery rack according to an embodiment.

FIG. 3 is a diagram illustrating the configuration of a battery rack according to an embodiment.

Referring to FIG. 3, the battery rack 110 includes one or more battery trays 111-1, . . . , 111-n connected in series and/or parallel as subunits. Each battery tray may include a plurality of battery cells as subunits. The battery cells may use various rechargeable secondary batteries. For example, the secondary batteries used in the battery cells may include a nickel-cadmium battery, a lead acid battery, a nickel metal hydride (NiMH) battery, a lithium ion battery, a lithium polymer battery, or the like.

The battery rack 110 may provide a desired output according to a connection method of the battery trays 111-11, . . . , 111-n, and output power to the rack protection circuit 130 through a positive electrode output terminal R+ and a negative electrode output terminal R−.

The battery rack 110 may include one or more tray BMSs 112-1, . . . , 112-n respectively corresponding to the battery trays 111-1, . . . , 111-n. The tray BMSs 112-1, . . . , 112-n monitor voltages, current, temperatures, etc. of the respective corresponding battery trays 111-1, . . . , 111-n. The monitoring results may be transmitted to the neighboring tray BMSs.

The monitoring results of the tray BMSs 112-1, . . . , 112-n may be collected by one tray BMS 112-1. The collected monitoring data Dm is transmitted to the rack BMS 120. The tray BMS 112-1 may receive a control signal Sc for controlling charging or discharging of the battery rack 110 from the rack BMS 120. Although it has been described that the tray BMS 112-1 positioned highest in FIG. 3 collects the monitoring results and receives the control signal Sc, other arrangements are possible. For example, the tray BMS 112-n positioned lowest may collect the monitoring results and receive the control signal Sc. In another embodiment, the tray BMS which collects the monitoring results and transmits the monitoring data Dm to the rack BMS 120 may be set different from the tray BMS which receives the control signal Sc.

Referring back to FIG. 2, the rack BMS 120 is connected to the battery rack 110 and controls charging and discharging operations of the battery rack 110. The rack BMS 120 may perform functions of overcharge protection, overdischarge protection, overcurrent protection, overvoltage protection, overheat protection, cell balancing, etc. To this end, the rack BMS 120 may receive the monitoring data Dm relating to a voltage, a current, a temperature, a remaining amount of power, a lifetime, and a state of charge, etc. from the battery rack 110, generate the control signal Sc based on the monitoring results, and control the rack protection circuit 130. The rack BMS 120 may supply the received monitoring data Dm to the integrated controller 15 and receive a command related to a control of the battery rack 110 from the integrated controller 15.

Figure 4:
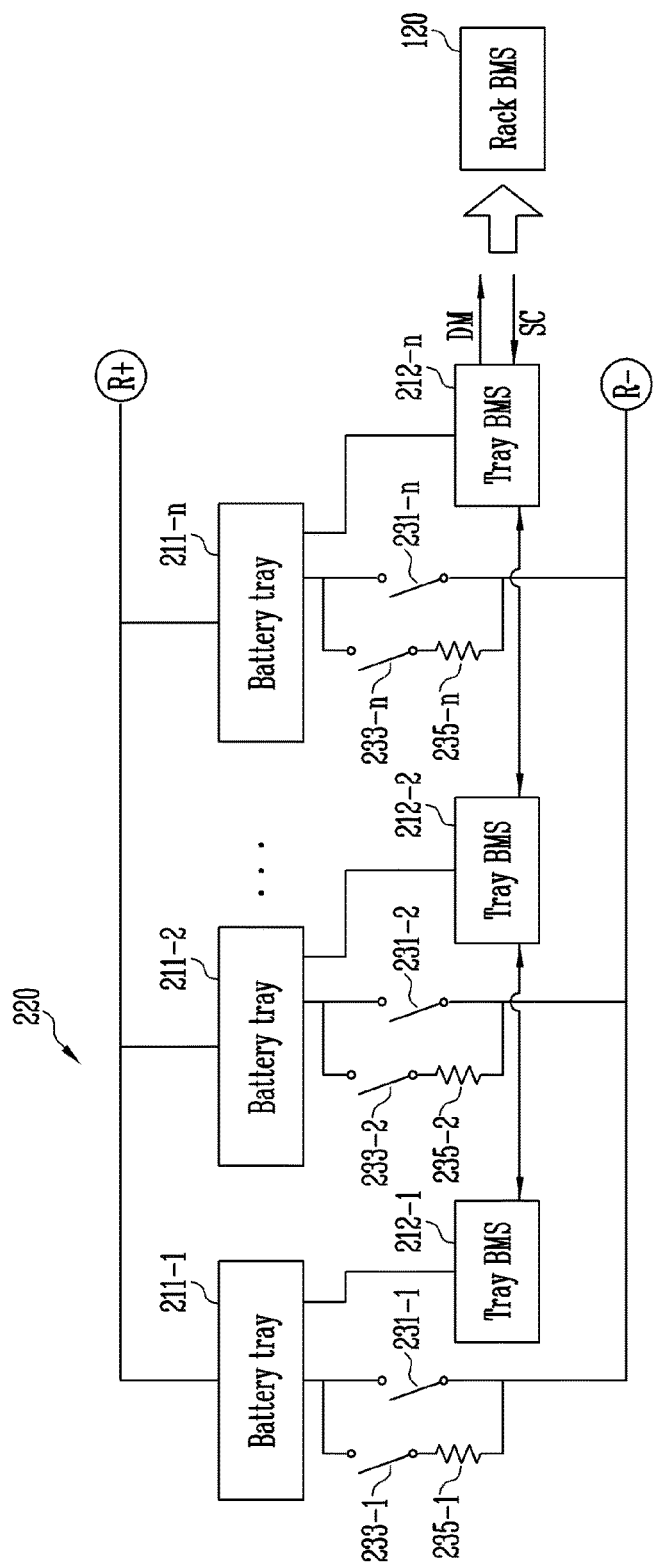
FIG. 4 is a diagram illustrating the configuration of a battery rack according to another embodiment.

FIG. 4 is a diagram illustrating the configuration of a battery rack according to another embodiment.

Referring to FIG. 4, the battery rack 220 includes one or more battery trays 211-1, ..., 211-n connected in parallel as subunits. Each battery tray may include a plurality of battery cells as subunits.

The battery rack 220 outputs power to the rack protection circuit 130 through a positive electrode output terminal R+ and a negative electrode output terminal R− of the battery trays 211-1, ..., 211-n.

In the battery rack 220, a battery tray may be additionally connected in parallel in order to expand the capacity of the battery system 20 or a new battery tray may be connected to the battery rack 220 in order to replace a broken or malfunctioning battery tray. When the difference between the voltage (voltage between R+ and R−) of the battery rack 220 and the voltage of the newly added battery tray is large, a large current flows into one of the battery rack 220 and the newly added battery tray, and therefore, a breakdown of the system may be caused.

In order to prevent such a problem, when a battery tray is newly connected, the voltage of the battery tray is adjusted to substantially equal the system voltage of the battery rack 220 and the battery tray is then connected to the battery rack 220. To implement this method, a separate charging or discharging system is required.

Thus, in the described technology, when a module having a power source of a new battery tray is connected to the battery rack 220, a connection control circuit is provided between the battery tray and the battery rack 220 in order to prevent overcurrent from flowing into the battery tray or the battery rack 220.

Hereinafter, for convenience of illustration, a second battery tray 211-2 among the battery trays being newly connected to the battery rack 220 will be described. Here, a connection control circuit is provided on a path between the second battery tray 211-2 and the battery rack 220. However, the connection control circuit may be provided on a path between each of the battery trays and the battery rack 220.

The connection control circuit includes a first switch 231-2 provided on the path between the second battery tray 211-2 and the battery rack 220 which is a module configured by connecting a plurality of battery trays in parallel, a second switch 233-2 provided on the path between the second battery tray 211-2 and the battery rack 220, the second switch 233-2 being connected in parallel to the first switch 231, and a resistive element 235-2 for current limitation, connected in series to the second switch 233-2.

A second tray BMS 212-2 monitors the voltage, current, temperature, etc. of the second battery tray 211-2 and may receive system voltage information of the entire battery rack 220 from a neighboring tray BMS. Alternatively, the second tray BMS 212-2 may receive voltage information of the battery rack 220 through the rack BMS 120.

The second tray BMS 212-2 first turns on the second switch 233-2 to connect between the second battery tray 211-2 and the battery rack 220. The resistive element 235-2 for current limitation is connected to the second switch 233-2, and thus, it can prevent overcurrent which may flow when the second tray BMS 212-2 and the battery rack 220 are directly connected through the first switch 231-2.

The charging or discharging of the second battery tray 211-2 connected to the battery rack 220 is performed by the difference in voltage between the second battery tray 211-2 and the battery rack 220. Accordingly, the difference in voltage between the second battery tray 211-2 and the battery rack 220 decreases.

When the difference in voltage between the second battery tray 211-2 and the battery rack 220 reaches a predetermined value, the second tray BMS 212-2 turns on the first switch 231-2.

That is, if the amplitude of current flowing in any one direction due to the difference in voltage between the second battery tray 211-2 and the battery rack 220 is within a range which does not influence on internal components, etc. of the second battery tray 211-2 or the battery rack 220, the second battery tray 211-2 is directly connected to the battery rack 220 through the first switch 231-2. The second tray BMS 212-2 can turn off the second switch at the same time as turning on the first switch.

Figure 5:
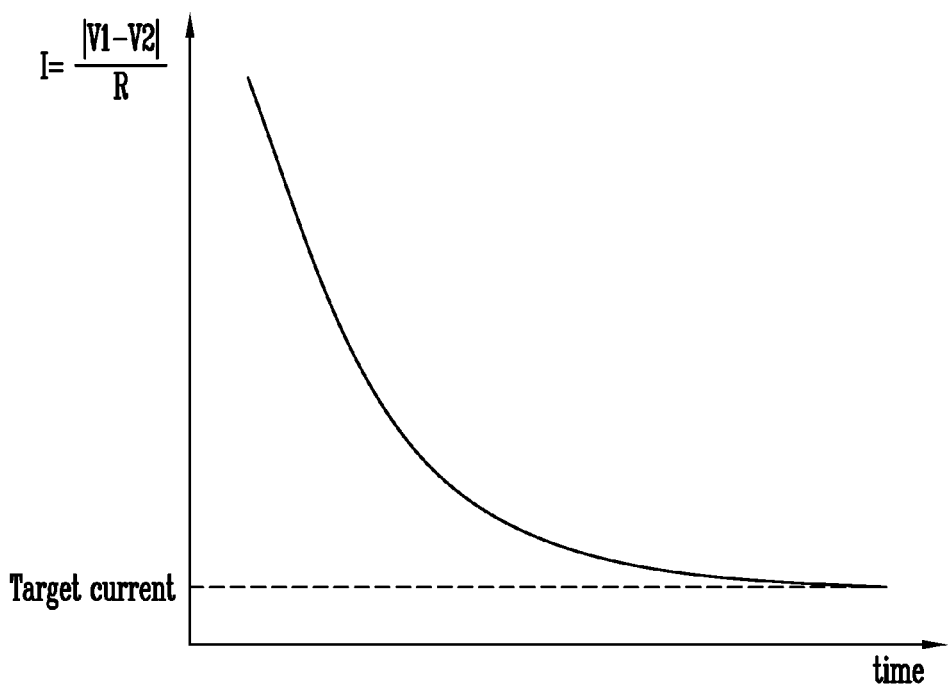
FIG. 5 is a graph illustrating the amplitude of current flowing between a newly connected battery tray and a battery rack according to an embodiment.

FIG. 5 is a graph illustrating the amplitude of current flowing between the newly connected battery tray and a battery rack according to an embodiment.

Referring to FIG. 5, the current flowing between the battery tray and the battery rack may be expressed as shown in the following equation.

$$I = \frac{|V1 - V2|}{R} \qquad \text{EQUATION 1}$$

Here, I denotes the current flowing between the added battery tray and the battery rack, V1 denotes the voltage of the second battery tray 211-2, V2 denotes the voltage of the battery rack 220, and R denotes the resistance of the resistive element 235.

As can be seen in FIG. 5, the current flowing between the second battery tray 211-2 and the battery rack 220 starts flowing at the moment when the first switch 231-2 is turned on and then gradually decreases. However, as the difference between V1 and V2 decreases, the rate of decrease of the current also decreases. When the difference between V1 and V2 is within a predetermined range, it takes a relatively long time to reach a target current.

The resistive element 235-2 having low resistance may be used in order to reduce the time taken to reach the target current. In this embodiment, a relatively large current, however, flows through the resistive element 235-2 for a short time, and therefore, a problem may be caused due to excessive heat generation from the current flowing through the resistive element 235-2.

According to another embodiment, the state (on/off) of the second switch 233-2 is controlled in order to control the duty ratio of the second switch 233-2 connected to the resistive element in order to solve the problem of heat generation in the resistive element 235-2. Simultaneously, the difference between V1 and V2 can be lowered to within the predetermined range in a relatively short time period.

More specifically, the second tray BMS 212-2 controls the second switch 233-2 with a duty ratio predetermined when the second switch 233-2 is initially operated.

In this embodiment, the duty ratio predetermined when the second switch 233-2 is initially operated may be determined as a duty ratio within a range which does not influence the system, based on the resistance of the resistive element 235-2 and heat generation conditions.

Subsequently, the second switch 233-2 is controlled by gradually increasing the duty ratio whenever the current flowing through the resistive element 235-2 reaches a critical current value. Here, the critical current value refers to a current value where the rate of decrease of the current becomes relatively low.

The duty ratio of the second switch 233-2 is increased when the difference between V1 and V2 decreases when compared with the time at which the second switch 233-2 was initially closed. Thus, heat generation of the resistive element can be prevented.

According to an embodiment, the second tray BMS 212-2 may reset the duty ratio by decreasing the critical current value by a predetermined value whenever the duty ratio increases. This is because the difference between V1 and V2 gradually decreases as the duty ratio increases over time.

Figure 6:
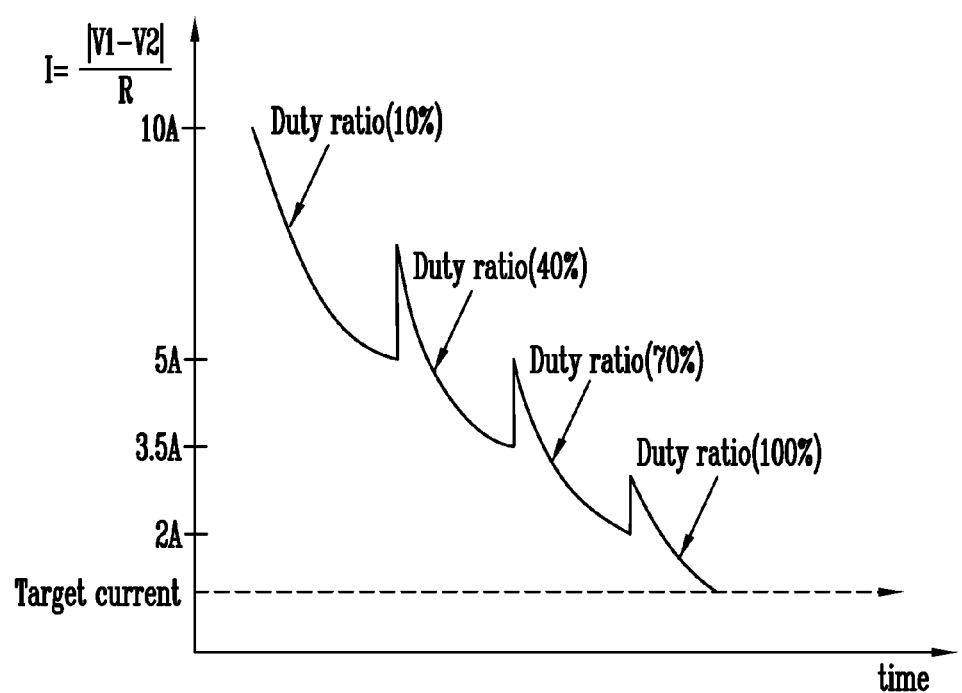
FIG. 6 is a graph illustrating the amplitude of current flowing between a newly connected battery tray and a battery rack when the duty ratio of a second switch is controlled according to an embodiment.

FIG. 6 is a graph illustrating the amplitude of current flowing between the newly connected battery tray and the battery rack when the duty ratio of the second switch is controlled according to an embodiment.

Referring to FIG. 6, the second switch 233-2 is initially operated with a duty ratio of about 10% and the current initially flowing through the resistive element 235-2 is about 10 A.

The difference between V1 and V2 decreases while the second switch 233-2 is operated with a duty ratio of about 10%. When the current flowing through the resistive element 235-2 reaches a critical current of about 5 A, the second tray BMS 212-2 resets the duty ratio to about 40%. In addition, the second tray BMS 212-2 resets the critical current, which is a reference point for changing to the next duty ratio, to about 3.5 A. This is because the amplitude of the current decreases as the duty ratio increases. Although it has been illustrated in FIG. 6 that the second switch 233-2 is controlled by increasing the duty ratio to about 10%, about 40%, about 70% and about 100%, the duty ratio may be variously set according to the capacity of the battery rack 220, the capacity of the second battery tray 211-2 and the resistance of the resistive element 235-2.

According to another embodiment, a temperature measuring unit (not shown) for measuring the temperature of the resistive element may be further provided.

The second tray BMS 212-2 can control the duty ratio of the second switch 233-2 so that the temperature of the resistive element 235-2, measured by the temperature measuring unit, is maintained at a predetermined dangerous temperature or less. Here, the predetermined dangerous temperature refers to a maximum temperature which does not negatively influence the second battery tray 211-2 or the battery rack 220.

For example, the second tray BMS 212-2 can control the duty ratio of the second switch 233-2 to about 50%. When the temperature of the resistive element 235-2 reaches a predetermined temperature, the duty ratio of the second switch 233-2 may be set to about 10%. Subsequently, when the temperature of the resistive element 235-2 reaches a predetermined safe temperature, the duty ratio of the second switch 233-2 may be again set to about 70%. When the temperature of the resistive element 235-2 reaches the predetermined dangerous temperature, the duty ratio of the second switch 233-2 may be set to about 30%. When the temperature of the resistive element 235-2 again reaches the predetermined safe temperature, the duty ratio of the second switch 233-2 is set to about 100% so that the difference in voltage between the second battery tray 211-2 and the battery rack 220 can become within the predetermined range in a relatively short amount of time. Since the difference between V1 and V2 decreases as time elapses, the duty ratio set when the temperature of the resistive element 235-2 reaches the predetermined dangerous and safe temperatures is set to be greater than the previously set duty ratios.

According to another embodiment, the resistive element 235-2 is a variable resistor. In this embodiment, the second tray BMS 212-2 decreases the resistance of the variable resistor so that the current flowing through the variable resistor can be substantially constantly maintained even though the difference between V1 and V2 decreases after the second switch 233-2 is turned on. Since the resistance of the variable resistor decreases as time elapses, the difference between V1 and V2 can be decreased to within the predetermined range in a relatively short period of time.

Figure 7:
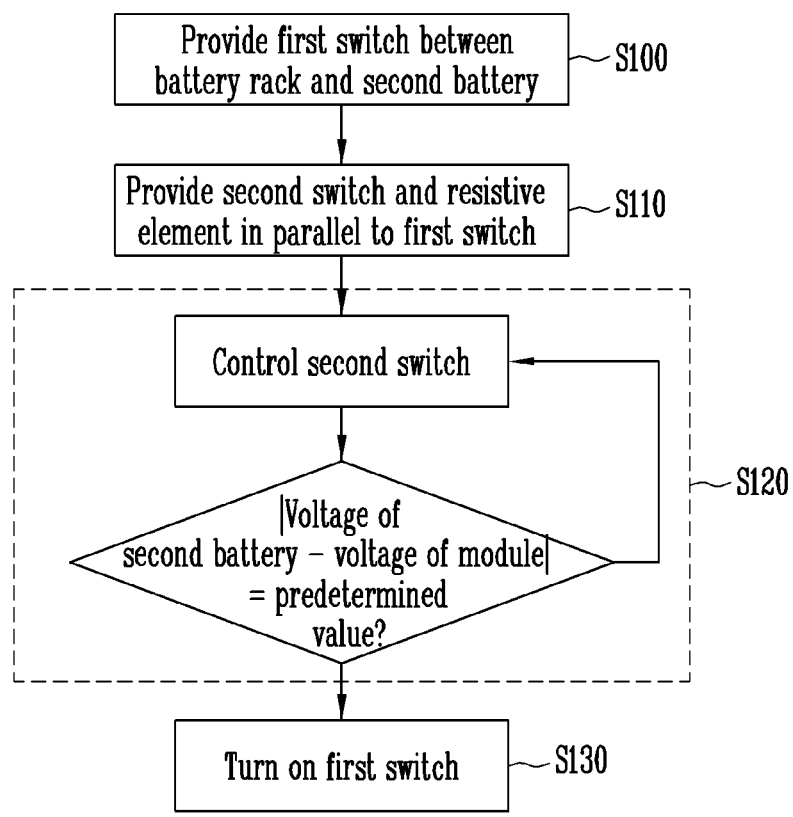
FIG. 7 is a flowchart illustrating a process of connecting a battery according to an embodiment.

Hereinafter, a method for connecting a battery according to an embodiment will be described with reference to FIG. 7. FIG. 7 is a flowchart illustrating a process of connecting a battery according to an embodiment.

Referring to FIG. 7, in step S100, a first switch is provided on a path between a battery rack including a plurality of first batteries in parallel and a second battery.

Subsequently, in step S110, a second switch and a resistive element are provided in parallel to the first switch.

In step S120, the second switch is controlled to connect the second battery and the battery rack and it is determined whether the difference in voltage between the second battery and the battery rack reaches a predetermined value.

When the difference in voltage between the second battery and the battery rack reaches the predetermined value, in step S130, the second battery and the battery rack are connected by turning on the first switch and turning off the second switch.

Figure 8:
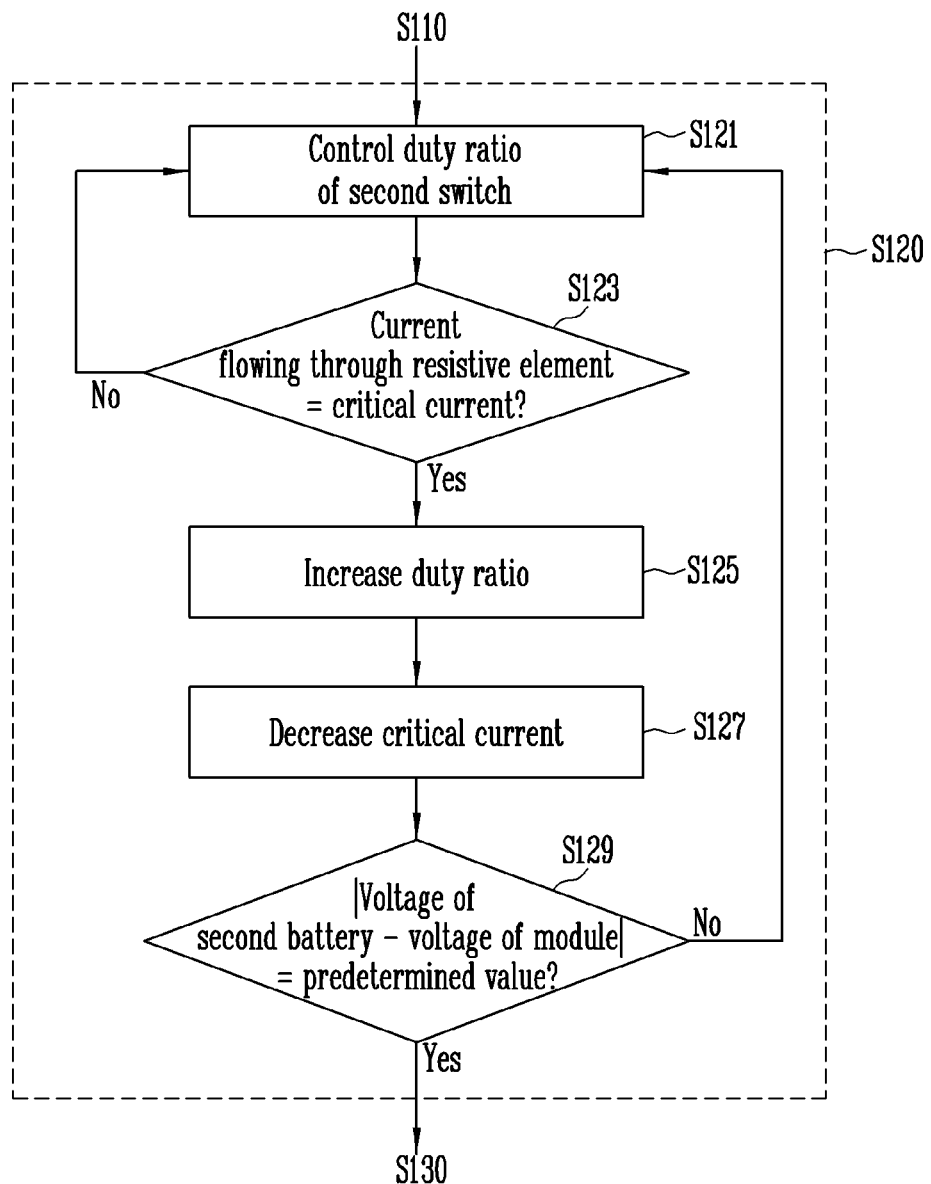
FIG. 8 is a flowchart illustrating in detail a process of controlling the second switch according to an embodiment.

FIG. 8 is a flowchart illustrating in detail a process of controlling the second switch according to an embodiment.

Referring to FIG. 8, in step S121, the duty ratio of the second switch is controlled.

Subsequently, in step S123, it is determined whether the current flowing through the resistive element reaches a critical current value.

When the current flowing through the resistive element reaches the critical current value, the duty ratio is reset by increasing the predetermined duty ratio (S125) and the critical current value is reset by decreasing the critical current value (S127).

In step S129, it is determined whether the difference in voltage between the second battery and the battery rack reaches a predetermined value. When the difference in voltage between the second battery and the battery rack reaches the predetermined value, the first switch is turned on and the second switch is turned off by proceeding to step S130. When the difference in voltage between the second battery and the battery rack does not reach the predetermined value, steps S121 to S129 are repeated.

Figure 9:
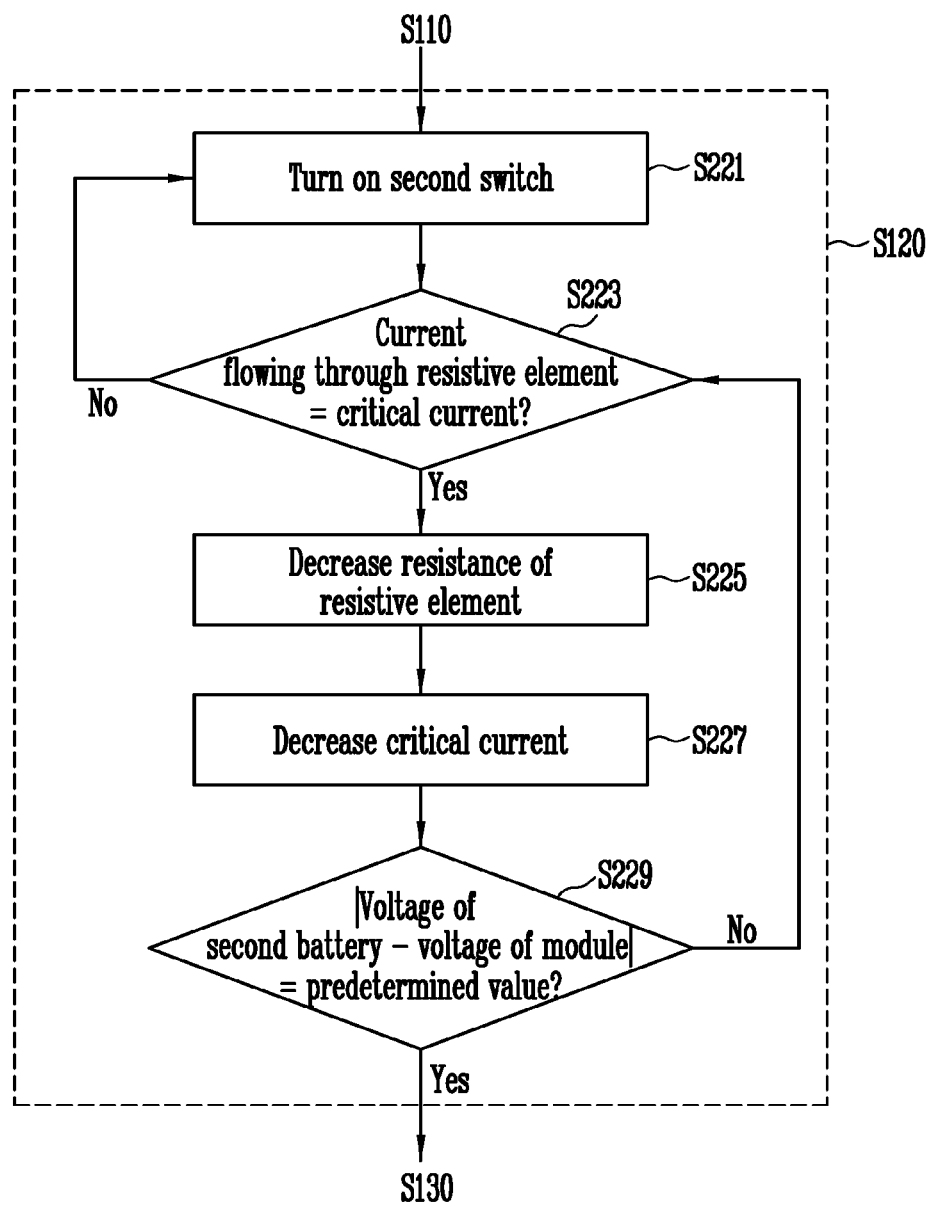
FIG. 9 is a flowchart illustrating in detail a process of controlling the second switch according to another embodiment.

FIG. 9 is a flowchart illustrating in detail a process of controlling the second switch according to another embodiment.

Referring to FIG. 9, in step S221, the second switch is turned on.

In step S223, it is determined whether the current flowing through the resistive element reaches a critical current value.

Here, the resistive element is a variable resistor. When the current flowing through the resistive element reaches the critical current value, in step S225, the resistance of the resistive element is decreased. In step S227, the critical current value is reset by decreasing the critical current value.

In step S229, it is determined whether the difference in voltage between the second battery and the battery rack reaches a predetermined value. When the difference in voltage between the second battery and the battery rack reaches the predetermined value, the first switch is turned on and the second switch is turned off by proceeding to step S130. When the difference in voltage between the second battery and the battery rack does not reach the predetermined value, steps S223 to S229 are repeated.

Example embodiments have been disclosed herein, and although specific terms are employed, they are used and are to be interpreted in a generic and descriptive sense only and not for the purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery system, comprising:
   at least one first battery connected between a positive electrode output terminal and a negative electrode output terminal;
   a second battery connected between the positive electrode output terminal and the negative electrode output terminal;
   a first switch configured to connect the second battery in parallel to the first battery;
   a second switch and a resistor connected in series and configured to connect the second battery in parallel to the first battery, wherein i) the first switch is connected in parallel to ii) the second switch and the resistor and the first switch and second switch are connected between the second battery and the negative electrode output terminal; and
   a battery management system (BMS) configured to: i) turn on the second switch so as to connect the second battery to the first battery and ii) turn off the second switch and turn on the first switch when the difference in voltage between the second battery and the first battery reaches a predetermined value, and wherein the BMS is further configured to control the duty ratio of the second switch.

2. The battery system of claim 1, wherein the BMS is further configured to: i) measure the voltage of the second battery and ii) receive the voltage of the first battery.

3. The battery system of claim 1, wherein the BMS is further configured to: i) set the duty ratio of the second switch to a predetermined level when the second switch is initially turned on and ii) increase the duty ratio as the voltage difference between the first and second batteries decreases.

4. The battery system of claim 3, wherein, when the current flowing through the resistor reaches a critical current value, the BMS is further configured to i) increase the duty ratio and ii) decrease the critical current value.

5. The battery system of claim 1, further comprising a thermometer configured to measure the temperature of the resistor.

6. The battery system of claim 5, wherein the BMS is further configured to control the duty ratio of the second switch so that the temperature of the resistor is less than a first predetermined temperature.

7. A battery system, comprising:
   at least one first battery;
   a second battery;
   a first switch configured to connect the second battery in parallel to the first battery;
   a second switch and a resistor connected in series and configured to connect the second battery in parallel to the first battery, wherein i) the first switch and ii) the second switch and the resistor are connected in parallel; and
   a battery management system (BMS) configured to: i) turn on the second switch so as to connect the second battery to the first battery and ii) turn off the second switch and turn on the first switch when the difference in voltage between the second battery and the first battery reaches a predetermined value, wherein the BMS is further configured to: control the duty ratio of the second switch so that the temperature of the resistor is less than a first predetermined temperature and i) lower the duty ratio of the second switch when the temperature of the resistor reaches the first predetermined temperature and ii) increase the duty ratio of the second switch when the temperature of the resistor reaches a second predetermined temperature lower than the first predetermined temperature.

8. The battery system of claim 1, wherein the resistor is a variable resistor.

9. The battery system of claim 8, wherein the BMS is further configured to decrease the resistance of the variable resistor as time elapses after the second switch is initially turned on.

10. A battery system of, comprising:
    at least one first battery;
    a second battery;
    a first switch configured to connect the second battery in parallel to the first battery;
    a second switch and a resistor connected in series and configured to connect the second battery in parallel to the first battery, wherein i) the first switch and ii) the second switch and the resistor are connected in parallel; and
    a battery management system (BMS) configured to: i) turn on the second switch so as to connect the second battery to the first battery and ii) turn off the second switch and turn on the first switch when the difference in voltage between the second battery and the first battery reaches a predetermined value, and wherein the BMS is further configured to control the duty ratio of the second switch,
    wherein the resistor is a variable resistor and the BMS is further configured to decrease the resistance of the variable resistor as time elapses after the second switch is initially turned on, and when the current flowing through the variable resistor is less than a critical current value, the BMS is further configured to: i) decrease the resistance of the variable resistor and ii) decrease the critical current value.

11. The battery system of claim 1, wherein the BMS is further configured to turn off the second switch and turn on the first switch at substantially the same time.

* * * * *